United States Patent Office 3,369,980
Patented Feb. 20, 1968

3,369,980
PRODUCTION OF GASEOUS UNSATURATED HYDROCARBONS
Preston L. Gant, Peter J. Manno, and Kang Yang, Ponca City, Okla., assignors to Continental Oil Company, Ponca City, Okla., a corporation of Delaware
No Drawing. Filed Aug. 15, 1963, Ser. No. 302,479
4 Claims. (Cl. 204—162)

This invention relates to an improved method of producing normally gaseous unsaturated hydrocarbons, and more particularly, ethylene and acetylene.

Hydrocarbons have been irradiated in the past to produce a variety of compounds. In some cases, the irradiation treatment caused the carbon-to-carbon bond to rupture with or without dehydrogenation of the hydrocarbons. Such treatments have been made, for the most part, on liquid hydrocarbons or solid materials. In the field of normally gaseous hydrocarbons, heretofore irradiation treatment has not shown promise, because the yields of unsaturates were too low for the cost involved. The use of ionizing radiation for making ethylene and acetylene can be attractive commercially if the cost of radiation source were reasonable and it were possible to control the reaction so that dehydrogenation were a major reaction. The present invention is concerned with such a process.

Accordingly, an object of this invention is to provide a method for the production of normally gaseous unsaturated hydrocarbons containing at least two carbon atoms. Another object of this invention is to provide a method for the production of normally gaseous unsaturated hydrocarbons by means of irradiation.

Other objects and advantages of this invention will become apparent from the following description and explanation thereof.

The present invention is concerned with subjecting a normally gaseous paraffin of two to four carbon atoms to ionizing radiation in the presence of glass wool.

The normally gaseous hydrocarbon which is to be converted to an unsaturated compound may be ethane, propane, butane or isobutane. The hydrocarbon feed may be used in pure form or one or more hydrocarbons can be present in gaseous hydrocarbon streams which may be derived from producing wells, refinery operations on petroleum crude, or any other operation in which gaseous hydrocarbons are produced as a by-product or otherwise. The quantity of normally gaseous saturated hydrocarbon in such streams may vary considerably for the purpose of this invention, however, in general, the desired hydrocarbon content can be about 50 to 100 percent by volume or more usually about 80 to 95 percent by volume.

The normally gaseous hydrocarbon feed material is charged to an irradiation or reaction zone in which there is present glass wool. The glass wool material is composed of strands or filaments of glass which are randomly positioned with respect to each other to simulate the appearance of wool or of a mass that will prevent any fluid from passing through without contacting one or more strands or filaments of glass. The strands or filaments may be of any desired cross section, for example, circular or non-circular and have an effective thickness of about 0.1 to 0.5 mil, more usually about 0.2 to 0.3 mil.

The normally gaseous hydrocarbon is subjected to an ionizing radiation of a wide degree of intensity in the practice of the present invention. The source of the ionizing radiation can be from accelerators of the isotope or particulate variety. The kind of radiation can also vary considerably, and may be radiation of the charged or unchanged type. The types of radiation can be, for example, neutrons, gamma, X-rays, alpha, beta, deuterons, protons, etc.

In practice, the glass wool may be suitably placed in a nuclear reactor and the gase feed passed through it while irradiation is occurring. The intensity of the radiation can be expressed as a rate in terms of reps per hour, and for the present purpose, the radiation rate can be from about $10^3$ to $10^7$ reps per hour, more usually about $10^4$ to $10^6$ reps per hour. The radiation dose given to the hydrocarbon feed can be of high or low intensity, but one advantage of the present invention is that surprisingly good yield of unsaturated products is obtained at low intensities. This advantages makes possible the utilization of radiation sources that are of too low intensity for other practical purposes. During the time that the hydrocarbon being treated is passed through the radiation zone, the total radiation dose may be from about $10^4$ to $10^8$ reps per hour, more usually about $10^6$ to $10^7$ reps per hour.

The irradiation of the normally gaseous hydrocarbon can occur over a wide range of radiation conditions. The temperature under which irradiation is effected may be about 0 to 50° C., more usually about 15 to 30° C. The pressure at which irradiation is done may be about 0.1 to 10 atm., more usually about 0.5 to 2.0 atm.

The present invention has particular application for the production of ethylene and acetylene from ethane. The irradiation of ethane in the presence of glass wool brings about a selective conversion to ethylene and acetylene. Hence, one of the significant reactions occurring during the irradiation is dehydrogenation. For reasons not clearly understood, the glass wool appears to catalyze the dehydrogenation reaction favorably, making the present invention useful as a method for the commercial production of ethylene and acetylene. The other attractive feature is that a source of low intensity radiation may be used for the conversion of ethane to ethylene and acetylene. Actually, fuel elements which are presently considered too low in intensity to be of any value may be used successfully in the practice of the present invention. Such fuel elements may have an intensity of about $10^4$ to $5 \times 10^5$ reps per hour. It should be understood that the other normally gaseous hydrocarbons containing three or four carbon atoms may also be dehydrogenated as indicated above for ethane.

To provide a better understanding of the invention, reference will now be had to specific examples of the present invention.

*Examples*

A series of experiments were made to determine the effect, if any, of the presence of the glass wool on the product distribution of irradiated ethane. For the purpose of the experiment, a "Pyrex" reaction vessel was equipped with break off seals and capillary constrictions. Purified ethane was charged to the reaction vessel to provide a pressure of about 300 mm. Hg. In some experiments, glass wool in an amount of 12 grams and having a circular cross section of 0.0002-inch diameter was placed in the reaction vessel, occupying a volume of 5 cc. in the vessel. In other experiments, oxygen was included with the ethane feed gas in an amount of 10 percent by volume, and the resultant gaseous mixture was irradiated with and without the presence of glass wool. The gaseous hydrocarbon was irradiated with four spent gamma fuel elements to provide an irradiation rate of $1 \times 10^5$ reps per hour. The fuel elements were surrounded by water and the irradiation treatment of the ethane occurred at about 25° C. After the irradiation treatment, the "Pyrex" vessels containing the product were connected to a Vapor Fractometer by means of the break off seals. The hydrogen content of the product was determined by the use of a silica gel column and a thermister detector, whereas the hydrocarbons were analyzed by means of a column of activated charcoal and a flame ionization detector. The results are given in the table below.

| Run No. | Time of Run, hr. | Glass Wool | $O_2$, vol. Percent | $H_2$, vol. Percent | $C_2H_4$, vol. Percent | $C_2H_2$, vol. Percent |
|---|---|---|---|---|---|---|
| 1 | 15.5 | No | ---------- | $1.9 \times 10^{-2}$ | 0 | 0 |
| 2 | 15.5 | Yes | ---------- | $3.0 \times 10^{-2}$ | $7 \times 10^{-3}$ | $1 \times 10^{-3}$ |
| 3 | 24.0 | No | 10 | $1.20 \times 10^{-2}$ | $8.0 \times 10^{-2}$ | $4.0 \times 10^{-2}$ |
| 4 | 24.0 | Yes | 10 | $1.45 \times 10^{-2}$ | $15.3 \times 10^{-2}$ | $6.5 \times 10^{-2}$ |

From the foregoing table, it is to be noted that the glass wool had a significant effect on the production of unsaturated hydrocarbons such as ethylene and acetylene.

Although this invention has been described with respect to particular embodiments thereof, it is not to be so limited, as changes and modifications may be made therein which are within the spirit and scope of the invention as defined by the appended claims.

We claim:

1. A process for the treatment of a normally gaseous straight-chain paraffinic hydrocarbon of 2 to 4 carbon atoms per molecule which comprises irradiating the hydrocarbon with high-energy ionizing radiation in the presence of a mass of glass wool to produce an unsaturated normally gaseous hydrocarbon.

2. The process of claim 1 wherein the normally gaseous hydrocarbon is ethane.

3. A process for the treatment of a normally gaseous straight-chain paraffinic hydrocarbon of 2 to 4 carbon atoms per molecule which comprises irradiating the hydrocarbon with high-energy ionizing radiation at a rate of about $10^3$ to $10^7$ reps per hour until a dose of about $10^4$ to $10^8$ reps per hour is obtained, and the said irradiation occurs in the presence of a mass of glass wool.

4. The process of claim 3 wherein the hydrocarbon is ethane.

References Cited
UNITED STATES PATENTS

| | | | |
|---|---|---|---|
| 2,743,223 | 4/1956 | McClinton et al. | 204—162 |
| 2,905,607 | 9/1959 | Long et al. | 204—162 |
| 2,928,780 | 3/1960 | Harteck et al. | 204—157.1 X |

HOWARD S. WILLIAMS, *Primary Examiner.*